United States Patent [19]

Bristol

[11] Patent Number: 4,736,320

[45] Date of Patent: Apr. 5, 1988

[54] COMPUTER LANGUAGE STRUCTURE FOR PROCESS CONTROL APPLICATIONS, AND TRANSLATOR THEREFOR

[75] Inventor: Edgar H. Bristol, Foxboro, Mass.

[73] Assignee: Foxboro Company, Foxboro, Mass.

[21] Appl. No.: 785,575

[22] Filed: Oct. 8, 1985

[51] Int. Cl.$^4$ .............................................. G06F 15/46
[52] U.S. Cl. ................................................... 364/300
[58] Field of Search ...................... 364/300, 147, 194

[56] References Cited

U.S. PATENT DOCUMENTS 4,546,435 10/1985 Herbert et al. ..................... 364/300

Primary Examiner—Raulfe B. Zache
Attorney, Agent, or Firm—Wolf, Greenfield & Sacks

[57] ABSTRACT

A language structure and translator specifically adapted for use in constructing computer programs for controlling chemical and physical processing. The translator converts to compilable code programs written as statements expressing control intentions or results. Each textual function and statement is expressed as a data structure which expresses the function, as configured, and the state and values most recently calculated for the relevant variables. Provision is made for treating the program structure (i.e., control connections, program order and components, etc.) as a part of the dynamic state of the application. Graphical symbols, or icons, are employed to draw the eye to critical features in the control program and to lead the eye through critical interrelationships among the several commands of a complicated control system. At the same time, the translator treats the keystrokes generating these icons as statements (i.e., commands) which define the relationships among other associated program statements (which are usually textual commands), to control the order in which the operations represented by those statements are executed.

4 Claims, 10 Drawing Sheets

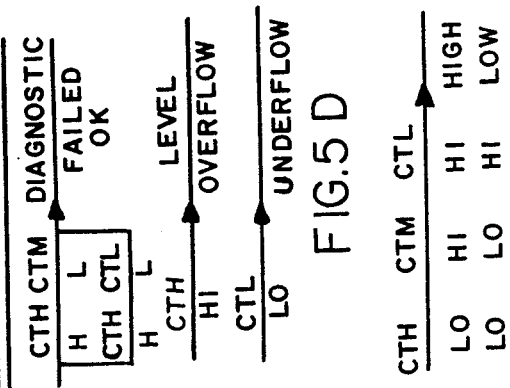
FIG.5D
FIG.5E
FIG.5B
FIG.5C
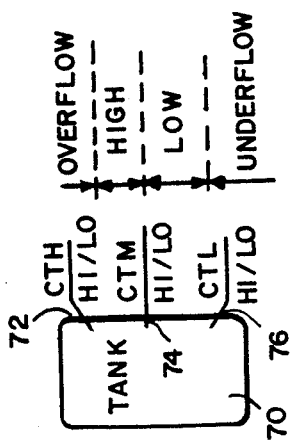
FIG.5A
```
TEST_LEVEL
  TEST(LEVEL: DIAGNOSTIC)
  OVERFLOW: "TANK OVERFLOWING"
  UNDERFLOW: "TANK EMPTYING"
  FAILURE: "CONTACT FAILURE. CONTACTS: CTH, CTM OR CTL"
```
FIG.6

KEYBOARD ENTRY:

OPERATION *select* DEMO EXAMPLE ⓒ
DEFINITIONS *select* ⓒ
DISCRETE Δ OUT Δ STATES ⓒ
V101 Δ 1 Δ OPEN/CLOSE ⓒ
V110 Δ 2 Δ OPEN/CLOSE ⓒ
V111 Δ 3 Δ OPEN/CLOSE ⓒ
V201 Δ 4 Δ OPEN/CLOSE ⓒ
V210 Δ 5 Δ OPEN/CLOSE ⓒ
V211 Δ 6 Δ OPEN/CLOSE ⓒ ⓒ
REAL Δ OUT Δ MIN Δ MAX Δ UNITS ⓒ
V100 Δ 8 Δ 0 Δ 100 Δ % ⓒ
V200 Δ 9 Δ 0 Δ 100 Δ % ⓒ ⓒ
REAL Δ IN Δ MIN Δ MAX Δ UNITS ⓒ
P100 Δ 1 Δ 0 Δ 500 Δ PSIG ⓒ
P200 Δ 2 Δ 0 Δ 500 Δ PSIG ⓒ
F100 Δ 3 Δ 0 Δ 500 Δ PSIG ⓒ
F200 Δ 4 Δ 0 Δ 500 Δ PSIG ⓒ ⓒ

FIG. 7A

PAGE DISPLAY:

| OP: DEMO EXAMPLE | | PG: PROCEDURES | |
|---|---|---|---|
| DISCRETE | OUT | STATES | |
| V101 | 1 | OPEN/CLOSE | |
| V110 | 2 | OPEN/CLOSE | |
| V111 | 3 | OPEN/CLOSE | |
| V201 | 4 | OPEN/CLOSE | |
| V210 | 5 | OPEN/CLOSE | |
| V211 | 6 | OPEN/CLOSE | |
| REAL | OUT | MIN | MAX | UNITS |
| V100 | 8 | 0 | 100 | % |
| V200 | 9 | 0 | 100 | % |
| REAL | IN | MIN | MAX | UNITS |
| P100 | 1 | 0 | 500 | PSIG |
| P200 | 2 | 0 | 500 | PSIG |
| F100 | 3 | 0 | 300 | GPM |
| F200 | 4 | 0 | 300 | GPM |

| TYPE: OPERATION |
|---|
| REFERENCE COUNT |
| NAME: DEMO EXAMPLE } Variable length |
| ARGUMENT LIST |
| LAST ACTIVE REFERENCE |
| EXECUTION POINTER |
| STACK POINTER |
| DEFINING BLOCK |
| PROPERTIES POINTER |
| PAGES LENGTH |
| PAGE POINTER(S) } Variable length |

FIG. 8B

| TYPE: DEF. PAGE |
|---|
| DEFINING BLOCK |
| DEFINITIONS LENGTH |
| TABLE 1 LENGTH |
| FORMAT POINTER |
| DEFINITION POINTER } Repeated |
| REFERENCE COUNT |
| TABLE 2 LENGTH |
| HEADER POINTER |
| DEFINITION POINTER } Repeated |
| REFERENCE COUNT |
| --- |

FIG. 8C

| TYPE: DEF. FORMAT |
|---|
| LENGTH FORMAT |
| HEADING 1 } Variable length |
| HEADING 2 |

FIG. 8D

| TYPE: SYSTEM SYMBOL |
|---|
| REFERENCE COUNT |
| NAME: DISCRETE } Variable length |
| SERVICE ROUTINE |

FIG. 8E

| TYPE: STATE NAME |
|---|
| REFERENCE COUNT |
| NAME: CLOSE } Variable length |

FIG. 8F

| TYPE: VARIABLE |
|---|
| REFERENCE COUNT |
| NAME: V101 |
| LAST ACTIVE REFERENCE |
| DEFINING BLOCK |
| PROPERTIES POINTER |
| FORMAT POINTER |
| LENGTH DEF. |
| ATTRIBUTE 1 } Variable length |
| ATTRIBUTE 2 |
| --- |

FIG. 8G

ATTRIBUTE FORMATS:
DISCRETE:

| STATE VALUE INDEX |
|---|
| STATE DEGREE |
| STATE 1 COUNT |
| STATE 1 NAME(S) V.I. |
| STATE 2 COUNT |
| STATE 2 NAME(S) V.I. |
| --- |

FIG. 8H

REAL:

| REAL VALUE |
|---|

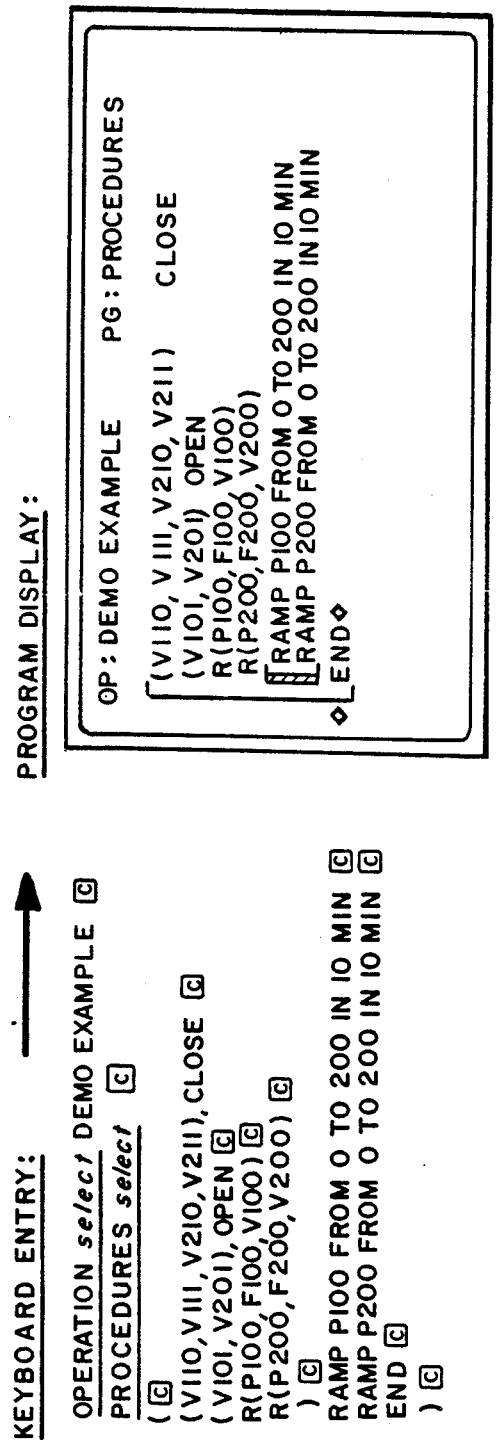

PARAMETER AND ACTIVITY BLOCKS:

| TYPE: PROC. PAGE |
|---|
| DEFINING BLOCK |
| P-CODE LENGTH |
| P-CODE ENTRIES } Variable length |

FIG. 10A

| TYPE: PARAM. PAGE |
|---|
| DEFINING BLOCK |
| BLOCKS LENGTH |
| BLOCK POINTER } Variable length |

FIG. 10B

| TYPE: PARAM. BLOCK |
|---|
| REFERENCE COUNT |
| NAME: P100 } Variable length |
| LAST ACTIVE REFERENCE |
| DEFINING BLOCK |
| PROPERTIES POINTER |
| ALGORITHM POINTER |
| BLOCK ENTRIES } Variable length |

FIG. 10C

| TYPE: ACTIVITY |
|---|
| REFERENCE COUNT |
| NAME: ONLY FOR TASK s } Variable length |
| BRACKET INDEX |
| ARGUMENT LIST |
| LAST ACTIVE REFERENCE |
| EXECUTION POINTER |
| PROGRAM POINTER |
| DEFINING BLOCK |
| PROPERTIES POINTER |
| P-CODE LENGTH |
| P-CODE ENTRIES } Variable length |

FIG. 10D

EXAMPLE P-CODE FORMATS:

V100 = 0.0

FIG.11A | REAL.ASSN.CODE | V100 | 0.0 | RETURN STATE | ACT./INACT. |

V200 = V100

FIG.11B | REAL.ASSN.CODE | V200 | V100 | RETURN STATE | ACT./INACT. |

A = B+C*D

FIG.11C | R.XPR.ASSN.CODE | A | LENGTH | B+C*D | RETURN STATE | ACT./IN ACT. |

V101, OPEN

FIG.11D | DSCRT.ASSN.CODE | V101 | OPEN | RETURN STATE | ACT./INACT. |

RAMP P100 FROM 20 TO 40 IN 3 MIN

FIG.11E | RAMP.CODE | P100 | LENGTH | FROM | 20 | TO | 40 | IN | 3 MIN | RETURN STATE | ACT./INACT. |

R(P100, F100, V100)

FIG.11F | CALL.CODE | R | ARG. LIST | RETURN STATE | ACT./INACT. |

FIG.11G  → | P100 | F100 | V100 |

COMPUTER LANGUAGE STRUCTURE FOR PROCESS CONTROL APPLICATIONS, AND TRANSLATOR THEREFOR

FIELD OF THE INVENTION

This invention relates to the field of computer languages and translators, as well as to the field of control systems. More particularly, it relates to a method (i.e., an applications-oriented computer language structure and a translator therefor, such as an interpreter or compiler) for developing, describing and implementing process control systems for a wide variety of industrial applications. The translator accommodates the writing of programs in terms of self-documenting statements of control objectives or intentions.

BACKGROUD AND OBJECTS OF THE INVENTION

The present invention has broad application in a wide range of computer-driven control applications and analogous environments. Its virtues and operation will best be understood if it is described in the context of a specific type of control system, rather than in the abstract. For convenience, the context for explanatory purposes will be the field of industrial process control; it should be appreciated, however, that this is simply an exemplary context and is not limiting of the invention.

Industrial process control, as that term is used herein, refers to the control of manufacturing processes in industries wherein a product is, in at least some significant stage of production, a homogeneous fluid capable of being flowed in pipes or a stream of particles capable of being moved by a conveyor belt. The product can be operated upon by simple actuators such as valves, baffles and deflectors and its state can be determined (or at least estimated) by simple probing and sampling sensors. Typical industries included within this framework are those which manufacture petroleum products, chemicals, power, paper, and films, metals, textiles, plastics, foods, drugs, cement, and, increasingly, semiconductors.

Industrial processing systems, such as systems for preparing chemical compounds and for controlling other complex operations, frequently implement lengthy and highly detailed procedures. These procedures may involve hundreds, or even thousands, or steps in which various process parameters are monitored and selected process variables are controlled in predefined functional relationships which depend on the monitored parameters. Frequently, the control of such steps involves monitoring one or more measurements and initiating an action or setting a parameter (such as a temperature, pressure, composition, rate of change, amount of change, or the like) in response to the value or condition of the monitored measurement. Additionally, such procedures determine and control when individual processing steps are initiated as well as when they are terminated. Many of these steps typically must be performed in an established temporal relationship relative to one or more other steps. That is, step "x" is begun only after step "y" has been completed, or some predefined interval before or after step "y"; or steps "x" and "y" are carried out cocurrently.

There are many ways in which industrial process control systems can be categorized or classified. One of the most basic categorizations groups systems into so-called "batch control" systems (or processes) and so-called "continuous control" systems. In continuous processes, production material is flowed through a series of processing units in such a way that each unit performs a logically independent production step. In batch processing, by contrast, the production material is placed in a vessel (the batch processing unit) with various pieces of support equipment. That equipment may perform multiple production steps, such as heating, cooling, and pressurizing the vessel. A batch process may carry out all production by itself or it may be arranged in a production line with other batch processes or with continuous units.

In some situations, an entire processing complex may occupy more than one square mile. With such a large facility, organization has a significant effect on efficiency. A processing complex typically may be organized into a hierarchy of (from bottom to top) units, processes and plants. At the lowest levels, the elements may be integrated in an appropriate manner governed by the requirement of meeting the detailed stoichiometric requirements involved in producing a given product. At higher levels, processing may be more flexibly arranged and rearranged to respond to the needs of the business (e.g., to take advantage of the processing units which happen to be available at the time there is a desire to manufacture a given product). The present invention, which is explained below, addresses the lower levels, where there is a desire for a highly integrated automation of control processing; it is well-suited to developing both batch control and continuous control systems. The scheduling and rearrangement of the higher level processing resources is the role of process management, not process control, and is therefore outside the scope of this invention.

In batch processing, the sequencing of the production procedure is divided hierarchically into various levels of operation. The divisions are made generally along the lines of stages of production, operator intervention and monitoring. This facilitates the use of a plant for producing a variety of products. The physical plant resources may be shared so that these products may be produced at different times while using some or all of the same production equipment, either by rearranging the processing or by using the same procedure but varying parameters to yield a different grade of product.

Control automation in this environment must provide a method for imposing control procedures in a relatively simple form.

It is also highly desireable that the control automation process automate the record-keeping associated with the production of each lot, based on the control parameterization and sources of raw materials used therefor; this is important since there is often a need or desire, at some later time, to be able to identify the source of particular characteristics in a product.

Further, a given industrial process may have to be adjusted or changed from time to time - for example, to accomodate a substitution of raw materials or to make an improvement to the product. It is therefore important that the users of a computer-controlled processing plant be able to identify the portions (and the specific instructions) of the control program which require revision. In the past, these requirements have given rise to a need for extensive documenting of such programs, parameters and materials. This level of documentation is only achieved at considerable expense. And undocumented changes could be difficult to detect and analyze.

Various computer languages have been used in the past for developing and implementing process control procedures. These languages have included general purpose computer languages such as FORTRAN, BASIC, PASCAL, C and other high-level textually-oriented programming languages, as well as specially adapted variants of such languages. Other languages used for process control applications have included graphic features such as block diagrams and ladder diagrams, either by themselves or in conjunction with textual language features; these graphic features, however, typically have no command significance. Moreover, most such prior languages share certain characteristics. For example, they typically require the user to follow a rigid control format using a general purpose instruction set. Further, they provide at best an awkward connection between control functions. These drawbacks are often the result of trying to employ a highly generalized and highly structured language which is implementation oriented instead of being intention oriented. That is, the instruction sets of those prior languages typically emphasize the implementation of an operation as a series of instructions, whereas the control system designer is concerned with what he is seeking to accomplish (i.e., his intentions). Consequently, the control system designer, though is generally is not interested in the details of how the machine implements each control operation, is forced to become a computer programmer. Many of the errors introduced in system control programs are believed to be the result of the constant need for mental translation which this regime imposes on the designer.

One result of this situation has been an attempt to develop programming strategies to minimize the translation effort. The most obvious of these strategies is the use of subroutines. Subroutines, however, are of only limited benefit. They help when the subroutine requires only a few arguments which act only once each time the subroutine is called. When there are many arguments which must be passed between the main program and the subroutine, through, the subroutine call becomes confusing and the order and meaning of its arguments becomes difficult to remember. Further, it can be an onerous task to link up every argument; and the format is made even more awkward when any of the arguments is optional.

Ambiguity is also a problem in most general purpose programming languages. For example, the expression I=1 could represent a direct calculation, a flag setting, a loop initialization, or some other operation. By contrast, application functions are not likely to be this general.

Another result of the conflict between the application orientation of the control designer and the implementation orientation of general purpose programming languages is that control programs written in such languages require an extensive documentation effort, if they are to be intelligible to future users and are to be capable of being modified from time to time. The documentation activity typically is two-fold. First, the source code for the program must be supported with extensive textual comments. Second, a written manual or the like must be prepared to explain the logical organization and features of the program, nomenclature of variables and labels, and other appropriate information. Consequently, each time the program is modified, the comments in the source code must be revised and the manual must be updated. With a large control program which is being used and modified by a number of people, the support effort needed to maintain up to data documentation is substantial.

It is therefore an object of the present invention to overcome some of these deficiencies by providing a new type of computer language structure (and translator therefor) specifically suitable for use in designing and documenting control systems.

It is a further object of the present invention to provide a computer language structure and translator which allow a control system designer to program in terms of the control functions he desires to implement, rather than in terms of the computer's internal details.

Another object of the invention is to provide a computer language structure for use in developing programs to control process operations, such that control programs developed therewith are largely self-documenting.

A still further object of the invention is to provide a computer language structure in which the temporal relationships between controlled processes is readily apparent to a reader of a program listing.

Yet another object of the invention is to provide a data structure for a programming environment in which the supporting details for carrying out control operations are segregated from expressions of control intentions, so as to enhance representation of the control intentions.

Still another object is to provide a programming environment for control system programming in which statements of control intentions can be expressed clearly and with little or no ambiguity.

SUMMARY OF THE INVENTION

These objects are achieved in the present invention by the provision of a novel language structure and translator; that is, a new method of operating and programming a computer system and a computer system thus controlled. The statements employed in this language structure are action-oriented and are specifically adapted for use in constructing process control programs. From these control-oriented statements, appropriate program code may be generated for operation of a computer to implement the desired control functions.

In its most complete inplementation, this language structure exhibits the following characteristics: (1) it organizes the control system into logically distinct application subsystems according to processing and control activities; (2) it provides distinct representations for logically different control activities; (3) it orders the display of configured data to make it predictable and easy to read and understand; (4) it represents and displays the program structure graphically, in a way which guides the eye to and through critical relationships; (5) it employs command statements which define precise application function roles, to reduce ambiguity in the underlying intent and in the relationship between the functional elements of a control program; and (6) it uses logical and/or standard application functions and practices to account for implied configuration activities.

Graphical symbols, or icons, are employed to draw the eye to critical features in the control program and to lead the eye through critical interrelationships among the several commands of a complicated control system. At the same time, the translator treats these icons as statements (i.e., commands) which define the relationships among other associated program statements (which are usually textual commands). While prior languages designed for development of documentation have used somewhat similar graphical symbol systems to make the documentation more readable, those graphical symbols have been only passive in nature and have not also served as command statements. Thus this language structure uses as commands a mixture of textual statements and graphic symbols.

Examples are shown below of specific commands for use in a language comporting with these characteristics and adapted for use in an industrial process environment. The invention, however, does not require the use of any specific set of command statements. Other command sets can and will be readily conceived to comport with this novel language concept. Indeed, in applications other than that shown herein, it will be necessary to provide a suitable set of commands which reflects the control or other functions to be implemented.

Every textual function and statement in the present invention is expressed as a data structure. The data structure expresses the function, as configured, and the state and values most recently calculated for the relevant variables. The program structure (i.e., control connections, program order and components, etc.) is considered to be as much a part of the state of the application as any process data, and as dynamic.

The invention is pointed out with particularity in the appended claims. The above and further objects, features and advantages of the invention may be better understood by referring to the following detailed description, which should be read in conjunction with the accompanying drawing.

BRIEF DESCRIPTION OF THE DRAWING

In the drawing,

FIG. 1A is a listing of a short routine illustrating three so-called IDIOM-type statements of process control of the type employed by the present invention, wherein the control intentions are immediately apparent in the formulation of each control statement;

FIG. 1B is a schematic diagram of a debutanizer bottom composition control system to which the example of FIG. 1A relates;

FIG. 5A is a schematic illustrations of a tank equipped with sensors for determining the state of the tank by detecting the presence or absence of fluid at three levels therein, annotated to show the four potential conditions of the tank depending on the sensor states;

FIGS. 5B and 5C are truth tables defining the tank states in FIG. 5A as a function of the sensor states;

FIGS. 5D and 5E are ladder diagram counterparts to the truth tables of FIGS. 5B and 5C;

FIG. 6 is an example of a TEST function call according to the present invention, for generating a message conditioned on the tank state;

FIG. 7A is a diagrammatic representation of the keyboard entry for an exemplary portion of a control program written in accordance with the present invention;

FIG. 7B is an illustration of a CRT display which would result from the keyboard input of FIG. 7A;

FIGS. 8A–8H are diagrammmatic illustrations of an OPERATION and its related DEFINITIONS PAGE data blocks according to the invention;

FIG. 9A is a diagrammatic representation of the keyboard entry for an exemplary portion of another control program written in accordance with the present invention;

FIG. 9C is an illustration of the CRT display of the keyboard entry of FIG. 9A;

FIGS. 10A–10D are diagrammatic illustrations of the data fields of the Parameters and ACTIVITIES related blocks of FIG. 9B;

FIGS. 11A–11G are diagrammatic illustrations of exemplary P-code formats for various IDIOM statements according to the invention.

DETAILED DESCRIPTION OF ILLUSTRATIVE EMBODIMENTS

Figure 1C:
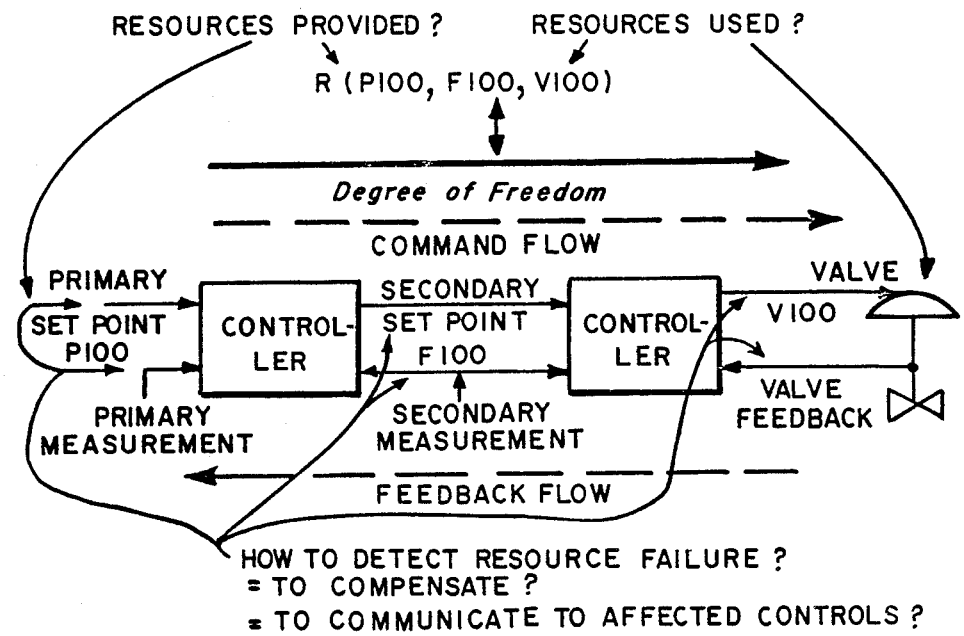
FIG. 1C is a diagrammatic illustration of an exemplary IDIOM according to the present invention, further illustrating the relationship between the IDIOM and its Command Feedback and State ASPECTS.

In the following description, extensive use will be made of terms having defined meanings. A convention has therefore been adopted to distinguish the use of such terms in their specially defined contexts from their use as terms having ordinary dictionary meanings. According to this convention, all terms defined as objects in this object-oriented language structure will be displayed in upper case block letters; and all terms defined as concepts will be displayed in upper case italics. Some terms will appear both as objects and as concepts.

After discussing the language structure, a translator for certain aspects thereof will be explained.

The guiding concept of the invention is expressed in a novel control structure, termed the IDIOM, for expressing individual control statements directly in terms of clear application intentions. As a concept, an IDIOM is a well-developed and standardized control strategy defined by its normal intention, its normal implementation, and the normal practices for connecting its implementing elements together to each other and to the surrounding system to accommodate the relevant control intentions and context. As a language element, the IDIOM is represented as a simple statement of control intention which is compilable or interpretable automatically into a user-adjustable, context-dependent control implementation. Beyond that, it is a statement which is structured to conform to or reflect necessary control function interconnections.

The IDIOM is a replacement for block diagrams and control loops. Using IDIOMs, the signal relationships between control functions are established (or replaced) by top down analyzed statements of control intention. Isolated single and multi-loop blocks are replaced by an automatic degree-of-freedom analysis of flexibly interconnected IDIOM calls.

Referring now to FIG. 1A, an example is given of several IDIOM-type intention-oriented control statements such as might be used to operate the bottom composition portion of the debutanizer of FIG. 1B. Statement 1 signifies to regulate the bottom's composition (BC1) of the debutanizer tower by manipulating a target value for the heat flow (Q1), which is itself regulated by manipulating the oil flow (OF1) with a valve (OV1). Statement 2 is an instruction to "low limit" the heat flow (Q1) to avoid tray weeping. And statement 3 is a direction to constrain within a high limit the differential pressure (DP1) across the tower to avoid flooding. Similarly, a statement such as R(TL2,OV2) could be used to represent the goal of regulating the Top Level TL2 with the Oil Valve OV2. That is, the single degree of freedom of OV2 is used to control TL2. Each of these IDIOMs would be implemented by one or more conventional controllers (which are implemented as software processes). The distinct IDIOM statement form of each of these expressions provides an unambiguous announcement of the intended role of each controller. At the same time, the listing and writing of the control program are not overburdened with the details of how the controllers are to be operated to bring about the respective control objectives. Thus in each case, the goal (i.e., the control objective) is defined by the function designation (e.g., R, LL, CH), the variable associated with the single controlled degree of freedom (BC1, Q1, DP1, or TL2, which are termed "control variables") and the manipulated variable (e.g., OV2, which is termed a "controlling variable"). The "low limit" statement is a unique case; it represents a limiting action on the controller set point corresponding to the heat flow variable Q1, which serves as both control variable and controlling variable.

Such IDIOM statements may be cascaded, as well. In that case, the controlled variable of the secondary controller through, its set point, is used as the controlling variable of the primary controller.

The notation of IDIOM statements, while similar to that of conventional subroutines or macros, invokes different actions at different times. A macro acts at system configuration or compilation time and a subroutine acts when it is encountered at run time in a program. By contrast, there are four different times of interest for a continuous control IDIOM. At system configuration time, the IDIOM is analyzed to set aside any control blocks needed to store tunings (i.e., adjustments to control parameters) and to establish basic control connections based on the permanent aspects of system context - i.e., to connect the control elements together in a way which reflects the physical connections between the various components in the processing system. At run time, when an IDIOM is encountered, the control calculations are configured automatically, based on context, to determine relative computation order and final connections. At sample time, while the IDIOM is active, the configured calculations are run in appropriate order. Finally, when the segment of program involving the IDIOM calculations completes execution, the IDIOM's calculations are disconnected.

Various types of IDIOMs are provided for in the language structure, along with the freedom for the user to define its own IDIOMs.

Briefly, there are two key IDIOM concepts: the KEY VARIABLE and the IDIOM SPACE. KEY VARIABLES are variables whose values are controlled, or manipulated to carry out control; they nmodel the process variables in their feedback control participation. The IDIOM SPACE is a directed graph which is modeled by data structures described below, to represent the current disposition of degrees of freedom called for by the IDIOMatic control subsystem.

KEY VARIABLES must have a measurement ASPECT and a control ASPECT; these will normally be drawn from the attributes defined on the DEFINITIONS PAGE. These ASPECTs permit the monitoring of success and failure to control. Every IDIOM call is implemented in a way that allows access to the Command, Feedback and State ASPECTs of each of the KEY VARIABLES that is manipulates directly to carry control, and those that it is responsible to maintain under control. This approach is illustrated in FIG. 1C. As will be apparent from that illustration, the exemplary IDIOM indicates both the resources it provides and the resources it consumes. In this case, it uses the valve feedback variable V100 and provides a pressure, P100. In this cascaded arrangement, there is a single degree of freedom path of control. The ASPECTs define a two-directional signal flow: commands flow from primary set point to final actuator, or valve, and feedback flows from valve or actuator to primary controlled measurement.

In an industrial control system, the physical equipment may be grouped hierarchically into process units, plants and complexes, as noted above. Similarly, the language structure employs a control element which may be organized hierarchically into various levels of control. This basic control entity is referred to as an OPERATION. The control computations within an OPERATION are classified into different categories and each catetory of function is assigned to a corresponding, specially formatted portion of the program referred to as a PAGE.

Various levels of subOPERATIONs, or TASKs, are also available. The levels of subOPERATION correspond to the levels of plant equipment which are available, whereas a TAST represents a separatly invoked procedures operating on the data of its OPERATION. TASKs and subOPERATIONs are expressed and visually subdivided into ACTIVITIES by easily distinguished icons; in the example described here, the icons are brackets and a different style of bracket is employed for each different kind of ACTIVITY.

The conditional execution structured statements of conventional languages are replaced by uniform TEST functions in a case-statement-like format.

To provide an appropriate background for discussing the control language structure, reference is now made to the instance of a continuous processing plant. In such a plant, the process unit, or unit operation, typically includes train of specialized vessels each designed to allow the progressive flow of the material. The control support for a unit operation may be divided into several distinct parts: process variables; input/output (I/O) variables, which define the source and destination of all control data; continuous controls, which act as a blanket of higher level access to the process; alarm data, which define various automatically invoked demands for operator intervention, and the various sequential activities needed to start, stop, and run the unit. The corresponding language structure object is the PAGE. There are six kinds of PAGEs; PROCEDURES, DEFINITIONS, DETAILS, PARAMETERS, ISSUES and SIMULATIONS. OPERATIONs are subdivided into the different types of PAGEs according to a corresponding division of the distinct types of control activity: I/O and variable definition, continuous control parameters, sequencing, etc. The subdivision is further based on natural process and language concepts. In principle, each PAGE can contain all of the programming of the corresponding PAGE type, for its OPERATION. In practice, however, it will sometimes be convenient to use several DEFINITIONS PAGEs or several PROCEDURES PAGEs.

Figure 2:
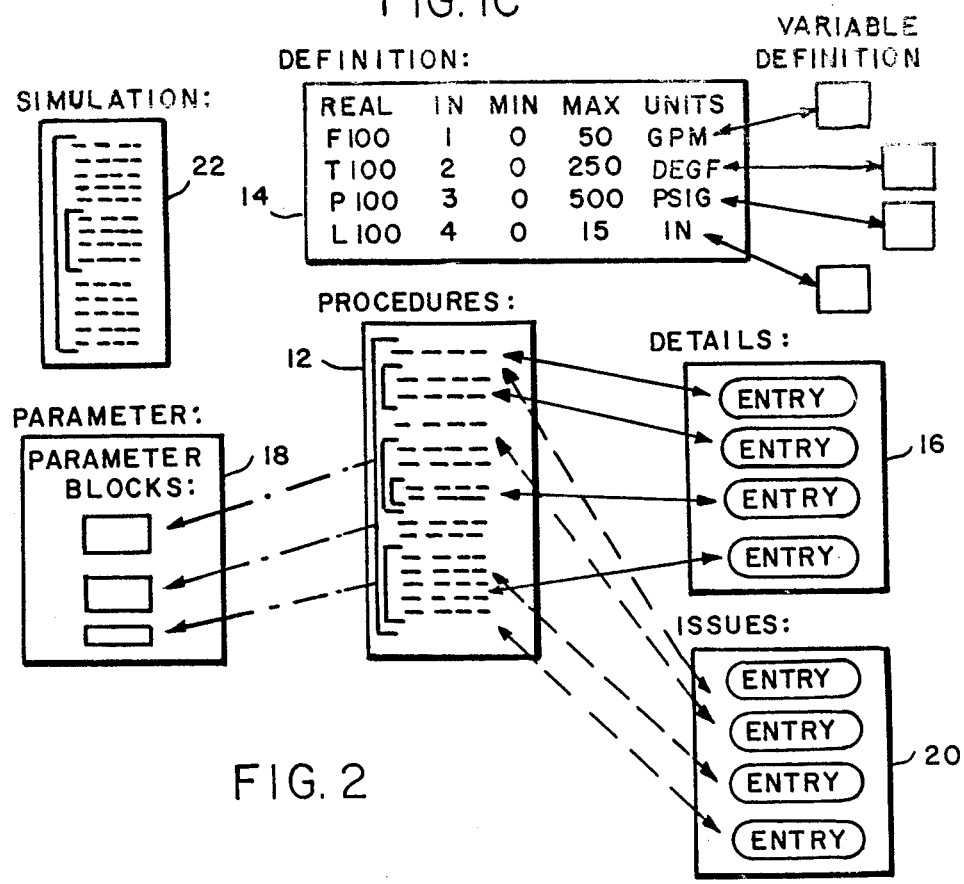
FIG. 2 is a diagrammatic illustration of the relationship between the various specially formatted portions (referred to as "PAGEs") of the control computations of a program written for execution with the present invention, depicting how each type of PAGE contains a different category of function.

The relationships among the PAGEs within an OPERATION is illustrated in FIG. 2.

PROCEDURES PAGEs 12 contain the procedural description of an OPERATION - i.e., every activity needed to run the unit. The PROCEDURES PAGEs define the continuous controls to the extent of their procedural roles, the timing of activity and the broad interconnections between the various controls. To the extent that alram limits and activities vary with time, the appropriate alarm functions are also specified on the PROCEDURES PAGEs.

The DEFINITIONS PAGE(s) 14 include all declarations of the statically structured data objects of the OPERATION: the different kinds of computational and process variables within the program, including the input/output source and conversion data, the alarm limits, and the operational states of each of these variables. The DEFINITIONS PAGEs define a layer of continuous I/O and processing activity which surrounds the process and the procedural programmed activities.

On the PROCEDURES PAGEs 12, some statements generate a more detailed perspective which the programming engineer may wish to see. Other statements require a more detailed level of definition and are linked to a higher level expression for that purpose. These additional perspectives are provided by the DETAILS PAGE 16, which has a separate DETAILS PAGE ENTRY (e.g., 16A) for each PROCEDURES PAGE statement which contains elaboration on the DETAILS PAGE. Further, the DETAILS PAGE 16 may have its own DETAILS PAGE (not shown), to allow further expansion of entries on DETAILS PAGE 16.

The control parameters and operating data associated with conventional control BLOCKs are listed on the PARAMETERS PAGE 18. The listings are made on the same ENTRY for (BLOCK) statement basis as applies to the DEFINITIONS PAGE. Each ENTRY on the PARAMETERS PAGE 18 contains the operational parameters associated with a control activity when these parameters are to be normally made available to operations personnel, such as for setting target values of control parameters. These ENTRYs may also be used as an orderly place to store parameters, particularly when the parameters are not naturally related to the normal procedural activity of the related routine and/or are too cumbersome to be included as part of a PROCEDURES PAGE program.

The ISSUES PAGE 20 associates with each statement the PROCEDURES PAGE 12 an optional text explanation of those process control issues behind the intent of the underlying PROCEDURES PAGE statement not immediately apparent from the statement itself.

The SIMULATIONS PAGE 22 allows a process simulation to replace the actual Process I/O, for use in testing the control program. It contains the same kind of computational statements as the PROCEDURES PAGEs and has the same associated DETAILS, PARAMETERS. and ISSUES PAGE ENTRIES. Whenever the OPERATION is in SIMULATION MODE, the Process I/O operations defined on the DEFINITIONS PAGE are inactive and the SIMULATIONS PAGE is active in its stead. Otherwise, the SIMULATIONS PAGE is inactive.

From the outside, an OPERATION allows one to treat the process unit as a fully controlled production machine which can be "turned on," "turned off," "run," or placed in one of several standard or programmed states. When an OPERATION is run, it appears like a subroutine call, continuing to any natural conclusion under its own volition. When turned on, it acts like a computational or physical process, proceeding from state to state, perhaps under external control. In either case, the DEFINITIONS PAGE defines a range of Process I/O-related activities which are from that point continuously active (except when expressly turned off).

More generally, when an OPERATION is turned on or run, all of its PAGEs start to operate, except for named subOPERATIONs or TASKs defined within the OPERATION. Like the OPERATION itself, these have to be independently run as a result of specific command statements. Within the OPERATION, its named parts (i.e., subOPERATIONs and TASKs) are thus also idealized as production machines to be run, turned on or turned off.

The temporary and time-related aspects of the OPERATION, on the other hand, are emphasized by its PROCEDURES PAGE(s). The PROCEDURES PAGE describes all activities as they occur once the OPERATION is turned on.

Within the PROCEDURE PAGEs, the process control program is structured into ACTIVITIES, each dominated by some concept of computational order: SEQUENCED, LOOPED, PARALLELED, CONTINUOUS, or STATE DRIVEN. Within this regime, the ACTIVITIES, subACTIVITIES, and underlying computational statements within an OPERATION operate on the various computational and process variables defined as part of the OPERATION on the DEFINITIONS PAGE. More generally, within an OPERATION all program elements may access or operate on any other object named in the OPERATION (e.g., variable, subOPERATION, etc.).

The control program associated with an OPERATION, like any other program, becomes unmanageable when allowed to grow indefinitely out of unnamed parts. Where ACTIVITIES can be defined which have a high-level significance or, like subroutines, have different uses when executed from different points within an OPERATION, they can be named and defined separately on a PROCEDURES PAGE as TASKs. Each use of the TASK still operates on the same subset of the process data and PAGEs defined within the OPERATION. In this manner, a TASK may be used to carry out a standard activity such as CONTROL STEAM FLOW or START REACTOR.

TASKs have the programming capability of OPERATIONs, without the elaboration of PAGEs and subOPERATIONs. There are no subTASKs within a TASK, although any TASK may call any other TASK. Thus TASKs allow simple programming for simple user routines. Further, consistent with this simplified role, TASKs are provided only with a simplified subroutine call mechanism; they can be run but cannot be turned on and off. OPERATIONs, by contrast, can be turned on and off and can be run, as well.

When the control program addresses not only process units, but also plants and other levels of equipment, then the control of these larger resources is expressed in terms of OPERATIONs, with the control of the process unit being treated as subOPERATIONs. The process variables or TASKs defined as part of the higher level OPERATION represent those aspects of the plant that are not part of any unit or are used in the control programs associated with several process units and the corresponding subOPERATIONs.

Certain TASKs, variables and other objects are needed by the entire control system. These objects can be defined in a GLOBAL ENVIRONMENT. This ENVIRONMENT contains all other objects in the language and has its own set of PAGEs within which the different classes of GLOBAL objects can be defined, as in an OPERATION.

The same model applies to batch processes. In the latter, however, the basic production unit (referred to as a Batch Unit) may be involved in several production operations; the relationship between the production operations and the production units is loose, as production units may be interchanged. The focus is therefore generally on an overall procedure for making a specified product. That procedure may be considered as a TASK; this TASK will, in general, operate on the process data of the OPERATION which contains the TASK.

Within Batch control terminology (as distinct prom the lexicon coined herein), a Procedure (in Batch terminology) for making products will be subdivided into different (Batch) Operations (i.e., major production steps, the sequential analog of the continuous unit operation), (Batch) Phases (the lowest level distinct, processing steps, whose boundaries represent the lowest level points in time for discretionary operator intervention), and (Batch) Steps (i.e., the lowest level visible manipulations of process equipment, such as opening a value or starting a motor). These activities will generally correspond to different kinds of subTASKs or statements. These TASKs may be defined in place like ACTIVITIES, having only the single use but being distinguished by their name.

When a Batch Procedure, Operation, Phase or Step has a need to use its own private data which is distinct from the data of the DEFINITINS PAGE in its defining OPERATION, that the activity can be implemented as a subOPERATION.

In larger batch plants, there may be several batch units capable of producing the same product according to the same Procedure. In this case, a mechanism is needed for connecting a Procedure to one of these several interchangeable units. For this purpose, each unit is represented as a subOPERATION within the plant OPERATION. The Procedure is then written as a TASK or subOPERATION within the plant OPERATION. Each unit subOPERATION has its own DEFINITIONS PAGE with its own process data. And, because the units have similar process variables, the names of like variables may be made identical. The TASK can be defined in the OPERATION using the same names but now undefined in the OPERATION's ENVIRONMENT. And a task may be run IN any OPERATION so long as that OPERATION is named (i.e., defined) in the TASK's current ENVIRONMENT. This has the effect of extending the TASK's ENVIRONMENT to include definitions of its undefined but names objects from the new OPERATION.

In more general applications, any TASK, ACTIVITY or STATEMENT from the current ENVIRONMENT can be run in any other accessible, named ENVIRONMENT. And the process can be reversed, to run in the current ENVIRONMENT a TASK FROM another defined, named ENVIRONMENT. These functions can also be combined: when a TASK is run FROM and IN a subOPERATION, it is considered to be run WITHIN that ENVIRONMENT. This allows the clear execution of various otherwise inaccessible service functions defined within a plant or unit OPERATION, such as WITHIN FURNACE: CONTROL TEMPERATURE. Further, one or more TASKs can be run WITH an OPERATION (i.e., IN the OPERATION while both are being run simultaneously). These functions allow an ENVIRONMENT to be extended indefinitely.

Figure 3:
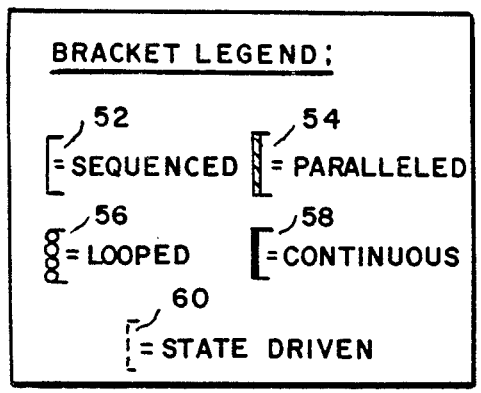
FIG. 3 is a pictorial illustration of an exemplary set of icons which may be employed with the present invention to illustrate and control the selection of an order of processing for the statements in a group of control statements labelled by the icons.

As previously indicated, the execution of TASKs and ACTIVITIES is governed by five concepts of computational order. That is, the execution of a combination of TASKs and ACTIVITIES may be SEQUENCED, LOOPED, PARALLELED, CONTINUOUS or STATE-DRIVEN. These relationships are created by stating every TASK and ACTIVITY as a list of one or more STATEMENTs, TASK or OPERATION calls, or ACTIVITIES, grouped by a bracket of one of five shapes. Each shape of bracket corresponds to one of the five concepts of computational order in which the list is to be executed. For example, as shown in FIG. 3, bracket 52 (a single, thin vertical line) represents a grouping of SEQUENCED STATEMENTS, TASKs or ACTIVITIES whose elements are carried out, each to completion, one at a time, in order, from top to bottom, terminated at the bottom. It models the kind of sequenced batch process or startup activity mentioned previously and corresponds to the usual sequential operation of most common programming languages. Bracket 54 (a pair of parallel vertical lines) represents grouping for parallel execution; that is, a grouping in which the elements are all executed independently, all at the same time, each being executed only once to completion. The ACTIVITY terminates when each component element is terminated. Bracket 56 (a series of chained loops) represents a looping process. In a LOOPED series of ACTIVITIES and/or TASKs, the listed STATEMENTs (and ACTIVITIES) in the loop are executed in sequence, but each time the execution of the last or bottom component element is completed, the entire sequence is repeated from the top down, until execution of the list is explicity terminated. Bracket 58 (a solid, bold vertical line) represents CONTINUOUS execution. That is, the listed elements in a CONTINUOUS ACTIVITY or TASK are executed in parallel, but each is repeated continuously until the ACTIVITY is terminated explicitly. Such CONTINUOUS ACTIVITIES represent the normal continuous analog or logic controls wherein each control algorithm is executed repeatedly on its data for every system sample time. Bracket 60 (a dashed vertical line) represents STATE-DRIVEN execution. The listed elements in a STATE-DRIVEN ACTIVITY or TASK are all preceded by conditional STATE PREFIXes (such as the expressions "DEDHAM:", "BRAINTREE:", and "HOME":, in FIG. 4). Each PREFIX corresponds to a possible user-defined STATE of the containing OPERATION, to which the OPERATION can be transferred by actions inside or outside the OPERATION, or outside the system. Only those STATEMENTs or ACTIVITIES whose PREFIXes correspond to the STATE of the OPERATION are executed within a STATE-DRIVEN ACTIVITY or TASK.

Thus, the various kinds of brackets serve as icons for underlying commands which specify the computational order, while at the same time providing to the programmer or system user a visible clue to that order. In fact, the graphical symbols used for the various brackets may, as illustrated, be designed so as to suggest their function. For example, the bracket which is used for a LOOPED execution sequence is composed of loops, while the bracket which is used for PARALLELED sequencing is formed with two parallel vertical lines. Of course, if the display generator lacks the capability of generating such special symbols, other, more conventional symbols may be used for These purposes. For entering the brackets at a console or terminal, special keys or combinations of keys may be assigned to each type of bracket. Or special begin bracket and end bracket symbols may be employed in lieu of repeating the bracket symbol for each intermediate ACTIVITY in a bracketed list.

Figure 4:
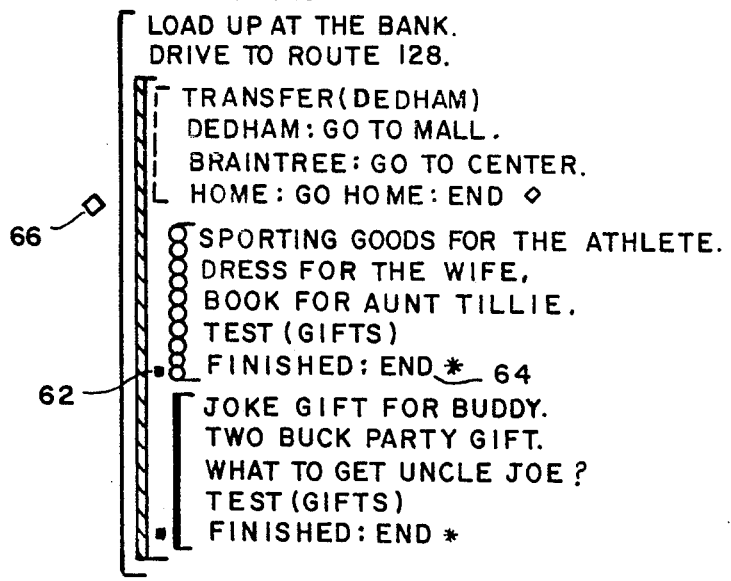
FIG. 4 is an example of a sequence of statements whose order is illustrated and controlled by the icons of FIG. 3.

The bracket-defined concepts of order may be overridden by prearranged commands, including various END command. For example, a single END command can terminate not only a given ACTIVITY but also a series of nested ACTIVITIES. An example of how this is indicated is shown in FIG. 4. There, a symbol is used in conjunction with the END command to signify that a series of ACTIVITIES is to be terminated. Specifically, the asterisk 62, together with the END command 64, terminates all ACTIVITIES bracketed to the right of the asterisk. And when the asterisk would be positioned to the left of all brackets, a diamond marker 66 is used, instead, to terminate all ACTIVITIES Basic regulatory process control functions (e.g., a proportional-integral-derivative, or PID, feedback controller) have been traditionally expressed by engineers as blocks in block diagrams. When implemented in software, such functions are often characterized by a comparatively large number of connections and parameters, making their expression as subroutine calls awkward. In the present invention, these functions may be analogously represented as BLOCKs. Each BLOCK has certain information associated with it, including type names (such as PID, Lead/Lag, Dead Time, Blend Ratio and other function indicators), tag names (which are normally the same as the measurement name in a related control loop), and PARAMETER PAGE ENTRIES (which display the values of operationally meaningful parameters or data connections for the BLOCK). The type name selects the underlying control algorithm supporting that kind of BLOCK, whereas the BLOCK instances within a given type are distinguished by their tag names. BLOCKs occur within a particular ACTIVITY and generally are limited in activity to the same duration as the ACTIVITY The BLOCK models control implementing modules, while the IDIOM models control intentions. Of course, a complete model of intentions must somehow bridge between the intentions and the implementation. Consequently, the IDIOM models not only the control modules as expressed by BLOCKs and control computational statements, but also the refined control engineering practices which have evolved over the years to connect these calculations into higher level combinations and to make them operationally useful.

Each IDIOM, or statement of intention, may be compiled by the system into a DETAIL PAGE ENTRY which defines the detailed implementation developed to support the intention, or a PARAMETERS PAGE ENTRY containing any necessary tuning or setup parameters.

It should be appreciated at this point that OPERATIONs, TASKs, BLOCKs AND IDIOMs all replace conventional subroutines and subroutine calls, with each being used in particular circumstances. The distinctions are based on the different needs for interfacing a subroutine to its arguments.

OPERATIONs and TASKs support arguments but generally pass their data more natually through their process-related data ENVIRONMENTs (data connections analogous to process connections). OPERATIONs and TASKs are distinguished in that OPERATIONs define their own data ENVIRONMENTs, whereas TASKs must operate in some externally defined data ENVIRONMENT BLOCKs are visualized in terms of block connections in a block diagram. The connections are defined in a tabular use of statements, which gives them a general flexibility and clarity not available in a subroutine call. Further, each BLOCK invocation (unlike a subroutine invocation) is uniquely named to provide operational access to the distinct PARAMETER PAGE ENTRIES and related operational displays.

The IDIOM uses a conventional argument list but actually connects the data according to control need and context.

A still further replacement for the conventional subroutine is referred to as the NATURAL LANGUAGE STATEMENT. The TEST statement is an example. These statements follow a simple syntax which allows the flexible distinction of several different classes of argument. An illustrative example is the statement RAMP P100 FROM 0 TO 200 IN 10 MIN. Other typical NATURAL LANGUAGE STATEMENTS include WAIT and MESSAGE.

According to another of its facets, the present invention employs a new framework for generating program instructions conventionally expressed as Boolean true/false logic, Boolean calculations, and related if-then-else structures. The programming of such logical constructs is the source of many programming errors in prior languages, largely due to the mental translation required between the statement of an objective and its formulation in Boolean-type expressions. To avoid Boolean style presentations, such "logical" controls are modelled on what is intended to be a more natural structure. In this structure, logic is treated as being based on enumerated variables, referred to herein as DISCRETE variables. A DISCRETE variable is used to represent any data which has a finite set of natural values, which values are represented by natural names or STATE values. Switches, digital contacts and other logical or discrete data are represented as such DISCRETE variables, with associated user-named STATE values such as ON/OFF, START/STOP, and HOT/COLD. These variables, of course, cannot be subjected to numerical algebraic computation, which is the precise reason that in the past they have been represented by corresponding Boolean values which lend themselves to mathematical manipulation. By contrast, the present invention uses a variant of the truth table and the ladder diagram to carry out any computation on DISCRETE variables.

For these purposes, a table is a listing of the values of one or more dependent (or result) variables listed against all significant combinations of the independent variables from which they are generated. Abstractly, the names of the variables are entered in a row above a ledger line, and the corresponding values of each variable are listed in a column below the line. Each row below the line corresponds to a legitimate combination of the values of all the variables. When a value is missing in a row, its variable does not matter in determining the value of the result variable. The table so defined generalizes to a ladder diagram-like form. Any valid ledger line traced from the left hand side of the page to the right without crossing another line or reversing direction, together with the heading variables and listed values can independently be treated as a truth table. When several permissible routes across the page give differing values to a result variable, the topmost result prevails.

An example is shown in FIGS. 5A–5E. FIG. 5A depicts a tank 70, having liquid sensors at three levels: a first sensor at a high point 72, a second sensor at a mid point 74 and a third sensor at a low point 76. The state of each sensor comprises a DISCRETE variable, referred to respectively as Contact Tank High, Mid and Low (CTH, CTM and CTL, respectively, for short). Each of CTH, CTM and CTL can have only one of two values at any instant: HI or LO. And the state of the tank must be either HI or LO. Physically, the three DISCRETE variables can be combined to define four tank level states: OVERFLOW, HIGH, LOW and UNDERFLOW. The truth tables of FIGS. 5B and 5C define a function whose calculated result, from the three sensors, is the corresponding tank value from among the foregoing four possibilities. Two forms of truth table are shown; they are equivalent and differ only in the position of the result column - it is either on the right side or on the left side. The ladder diagrams of FIGS. 5D–5E show a routine for calculating the correct level state, while recognizing any inconsistency which should be diagnosed as a sensor failure. In this case, an additional DISCRETE variable called DIAGNOSTIC has two possible states: FAILED and OK. FIG. 5D shows the equivalent of conventional ladder logic. It says that if CTH is HI and CTM is LO or if CTM is HI and CTL is LO then there is a clear sensor failure; otherwise, the sensors are probably OK. The three lines in FIG. 5E are referred to as one-sided ladder logic because, like the truth table, they list all the intended combinations individually; there is no extra result state to accomodate the situation of none of the independent variable combinations being appropriate.

Logic statements can generally be classified in terms of having one of two purposes. A logic statement or group of logic statements is employed either to carry out a direct calculation or to select one of a number of alternative calculations to be performed. Truth and ladder tables are powerful enough to deal with performing logic calculations but a different approach is preferable for the selection among alternatives. For the latter purpose, the choices may be expressed in case-statement-like form, wherein the states are calculated by a TEST function which may take any combination of analog or REAL comparisions and DISCRETE variables and return states derived directly from the variables themselves, or from built-in combinations of variables, or from a DETAIL PAGE truth table entry corresponding to the particular TEST function call. Thus, cases are defined in terms of states rather than in terms of integer-valued index variables. FIG. 6 shows a CONTINUOUS ACTIVITY which uses a TEST function to generate a message to the system operator if the tank 70 is going to underflow or overflow, or if the level sensors have failed. A TASK called TEST.LEVEL is called; this TASK has been written in the above-described manner to calculate the variables LEVEL and DIAGNOSTIC and depending on the results, to provide the appropriate message.

Of course, it is also important to be able in such systems to set the states of valves and other elements which can be modeled as DISCRETE variables with natural STATE named values. Further, a typical operation is the opening or closing of several valves together, in tandem. Statements may therefore be provided for setting every member of an associated set of valves (or other elements) to a common STATE, using a format which is easy to read. Examples are: V100,OPEN; (V103,V107),CLOSED. Further, PID BLOCKs can be placed in an automatic (AUTO) or manual (MANUAL) mode of operation, or entire OPERATIONs can be placed in one of several predefined states in like fashion: (T107,F107),AUTO; FURNACE,SUSPEND; C100,TEST(LEVEL). Equivalently, instead of the comma as an operator, one could use an equals sign as, for example, in V100=OPEN In the foregoing examples, the expression to the right of the assignment comma cannot be a variable, but it may be a state-valued function such as TEST. Consequently, the notation distinguishes between the STATE values of a variable and REAL or TIME values, and allows separate setting of each. REAL data represents the continous or analog quantities of conventional process control. TIME data represents changes in time or the absolute date and time. Another type of variable which is available is the UNDEFINED variable. The latter serve certain improvement roles, including: allowing programs to be defined in parts, before the objects referenced by them have been completed; allowing the importation of established TASKs into various ENVIRONMENTs; acting as dummy arguments when TASKs or OPERATIONs are to include arguments; and acting as PASCAL pointer variables, but with forced prior recording of all possible connected uses.

Before a control program can be run, all of the UNDEFINED variables must be defined on the DEFINITIONS PAGE as one of the earlier three categories of variables, or be assigned as an UNDEFINED REAL, DISCRETE, or TIME variable with defined attributes. For use in argument lists or under such importation, UNDEFINED variables must share the type and attributes of any variable with which they become connected. All connections in any of these roles are fully determined at configuration time and are fully checked for proper type. The UNDEFINED variable is expressed by special DEFINITIONS PAGE ENTRIES, entered manually or automatically.

Having thus explained the concepts and language structure involved in the invention, it will be apparent that these concepts and structures are utilized and put into practice by writing a translator (i.e., an interpreter or compiler) for accepting statements expressed in this language structure and generating interpreted or compiled program code therefrom. The interpreted or compiled program code provides the actual instructions to the computer, corresponding to the statements written by the control system designer.

Programs written in the present language structure are translated to an internal format in which the program structures are represented by data structures and within which well ordered data is represented by appropriate data fields and irregular statements are expressed as P-code. The data structure blocks are distinguished by type and are defined for every named object type, or for types similar to named types.

The writing of a translator based on the foregoing description is within the skill of systems programmers. However, to provide for others some understanding of the utilization of the invention, consideration will now be given the translation of a simple example showing the OPERATION as it is entered as a sequence of keyboard characters on DEFINITIONS and PROCEDURES PAGEs, as it is displayed on a CRT screen, and as it is represented in internal data structures. Within the example, the execution of IDIOM statements causes the temporary alteration of a data structure called the IDIOM SPACE.

Referring now to FIGS. 7A and 7B, the example program is a simple one requiring the definition of an OPERATION, possibly within some other OPERATION, which consists of just a DEFINITIONS PAGE and a PROCEDURES PAGE. It is most convenient to describe the DEFINITIONS PAGE first.

In discussing the keyboard input, the symbols "CR" and "SP" are used to represent the carriage return and space key actions, respectively. These keys have functional significance. FIGS. 7A and 7B show the correspondence between keyboard entry and PAGE display for the PROCEDURES PAGE of the example, respectively. In FIG. 7A, a "c" enclosed in a rectangle is substituted for CR and a small triangle is substituted for SP.

The DEFINITIONS PAGE consists of several tables of definitions, each table initiated with a line of headings as in the figure. Each of the headings is optional but when entered it specifies an attribute which each variable defined in the table must have. The keyboard is presumed to have certain special keys: OPERATION-select, DEFINITIONS-select, and PROCEDURES-select. These keys initiate an OPERATION, and to select the DEFINITIONS and PROCEDURES PAGEs, respectively.

When the DEFINITIONS PAGE has been selected for the newly-named DEMO EXAMPLE OPERATION, the first table may be entered, first with a heading line and then with the list of definitions. Each line is terminated with the CR key. Within the heading lines and definitions, each heading and each definitions word or value is separated from others by a single SP character. The table is terminated with a second consecutive CR. A table for a different class of variables may then follow in the same way.

The translator monitors the character string coming from the keyboard, testing for specific commands. When it identifies the OPERATION-select key, starting a new OPERATION, it creates and stores a new OPERATION data block. The format of the OPERATION data block is shown in FIG. 8a as a data block of type: OPERATION. In addition to its Type code (represented as an index, rather than the word OPERATION), it contains a Reference Count, the name of the OPERATION, an optional Argument List, a Last Active Pointer, and Execution Pointer, a Stack Pointer, a Defining Block, a Properties Pointer, a Page Length value, and Page Pointers. The Reference Count keeps track of all program references to the OPERATION, and is included for use during deleting, to obviate deletion of OPERATIONs still in use. The system uses the name of the OPERATION whenever reading new keyboard entries to try and match the OPRERATION, and to check for commands affecting the OPERATION. The name can be arbitrarily long, and so must contain a code defining its length. The Argument List, when present, is used when the OPERATION is called like a subroutine. The Last Active Pointer provides an audit trail to the last routine which altered, read, or otherwide referred to this OPERATION. The Execution Pointer is used to string the OPERATION on an operating system ring, and points to the TASK or OPERATION to be executed each sample time after the current one. The Defining Block references by a pointer the data block in which the current OPERATION was defined. The Properties Pointer allows the programmed attachment of irregular STATEs and ACTIVITIES to the OPERATION. The Pages Length value defines the number of PAGEs in the OPERATION. And the Page Pointers reference all of the PAGEs and allow system access to them.

When the translator distinguishes a DEFINITIONS-select key command in a new OPERATION definition, it further creates and stores a DEFINITIONS PAGE data block. It links the created block to the previously-created OPERATION block, using a Page Pointer in the OPERATION block and the pointer to the DEFINITIONS PAGE block's Defining Block. Within the OPERATION block the additional Page Pointer is counted into the PROCEDURES Pages Length data field to account for the larger block size.

In FIG. 8B, the block of Type DEF.PAGE has its Type code and Defining Block, fields having the same roles as with the OPERATION block. In addition, the DEFINITIONS PAGE block contains: a Definitions Length, which shows the length of the rest of the data block and is used by the system to locate the end of the block; any number (within the constraint of the Definitions Length) of definition tables, each consisting of (a) the Table Length defining the length of the table as stored in the DEFINITIONS PAGE block, permitting the system to find the end of the table, (b) a Header Pointer pointing to a Definition Format data block (described later), representing a list of the headers for the table columns, which therefore help to define the meaning of the definitions in the table, and (c) a set of references to the actual definitions of the control variables, each consisting of a Definition Pointer to a VARIABLE block (described later), and a Reference Count Counting all reference to the VARIABLE from within the OPERATION.

When the translator recognizes the initiation of a new DEFINITIONS PAGE and block, it interprets the next line of text as a list of Definition attribute names. Preparing for a new heading line, the system creates and stores a new DEFINITIONS FORMAT (FIG. 8C) and links it to the DEFINITIONS PAGE block through a DEFINITIONS PAGE Header Pointer. The DEFINITIONS PAGE Definitions Length is correspondingly incremented and a Table Length field is added to the block with the Header Pointer. As valid individual attribute names are recognized, they are added as DEFINITION FORMAT Header entries to the block.

The names are processed by recognizing each separate text word in the line and comparing the word to all the names represented in the named blocks by the system. When no match is made, or when the match is to a SYSTEM SYMBOL not corresponding to a legitimate attribute name as determined by the service routine referenced by the SYSTEM SYMBOL block (FIG. 8D), then the system will indicate a program error and require a correction. Otherwise, a pointer to the matching SYSTEM SYMBOL block (represented as a Heading in the above DEFINITIONS FORMAT block figure) is added as a Header pointer.

As Headings are added to the block, they are counted into the Length Format Data field which will be used to locate the changing end of the block. DEFINITION FORMAT blocks are also created in this way when the second CR is recognized terminating a Definitions Tables in the DEFINITIONS PAGE block.

When the header line is completed, then as long as the CR symbols are not doubled, each line is interpreted as a list of attributes. A new VARIABLE block (FIG. 8F) is then set aside and linked from the DEFINITIONS PAGE by a new Definitions Pointer, and to it by the Defining Block pointer. The individual attributes are recognized in the keyboard stream, checked for validity using the service routines of the corresponding DEFINITION FORMAT listed SYSTEM SYMBOLs. As part of this process, Variable Names are compared with other already deined Variables to check for redundant definitions. Legitimate, or properly matched, attributes are linked from the VARIABLE block using an Attribute pointer and counted in the Table Length count.

Individual attributes may be one of several types which include DISCRETE and REAL types, as well as the specially treated variable name and Units names. As the attribute is entered, the corresponding transfer of Real or name data is made to the VARIABLE block shown in FIG. 8F. As Attributes are added, the Length Definition field of the block is changed to account for the increase in length of the block, maintaining this data consistent to support the various memory management functions.

The DISCRETE Attribute represents a distinct case. This attribute consists, in the most general situation, of a list of mutually consistent lists of mutually inconsistent STATE NAMES (see FIGS. 8G and 8E). The STATE NAMES are separated by "/" symbols and the lists, by commas. Thus the entry "AUTO/MANUAL,-LOCAL/REMOTE" indicates that the DISCRETE Attribute may have either of the state values AUTO or MANUAL at the same time that it has either the value LOCAL or REMOTE. Internally, this notation is translated to a list of a number of State Degree lists, each with a number of entries equal to the corresponding State Count. The entries take the form of State Name pointers to corresponding STATE NAME blocks (FIG. 8E).

The PROCEDURES PAGE consists of a list of statements grouped hierarchically by vertically brackets, as shown in FIG. 9C. Apart from the Argument List block previously mentioned and not further considered, the discussion of the PROCEDURES PAGE requires four more types of blocks; the PROCEDURES PAGE block, the PARAMETERS PAGE block, the PARAMETERS BLOCK block, and the ACTIVITY block.

From the point of view of display, the work station passes the program keyboard stream to the CRT unchanged, with the following four exceptions: First, the brackets are recognized by matched pairs of parentheses, each individual parenthesis occurring on a different line. There are five different bracket types differentiated on program entry by the number of consecutive CR's occurring after the opening parenthesis. The work station and translator identify the bracket type by compiling an index. The number of consecutive CR's following the opening parenthesis is counted, the count is divided by five and the remainder is computed. This gives a value equal to 1, 2, 3, 4, or 0, which number is then used to select the bracket shape and is placed in the ACTIVITY block as a block Bracket Code. In the display, the bracket continues to develop until the matching closing parenthesis is encountered. Second, the position of the diamond symbol or asterisk which determines the level of commanded ACTIVITY termination for each END command is determined, by use of an index based on the number of consecutive CR's following the END command. In this case, the index is computed as the remainder achieved when dividing the number of consecutive CR's by the number of brackets crossing the current statement line. Third, the statements and brackets are indented to allow for the other brackets and the diamonds and asterisks associated with END statements. Fourth, any comma used as a DISCRETE assignment may, if desired, by displayed by used a uniquely drawn version of the comma, to enhance identification of its nature.

Within the PROCEDURES PAGE, the first level statements and ACTIVITIES are assumed to be executed in parallel when the OPERATION is called by name. The PROCEDURES PAGE also includes named TASKs individually executed on call by name. As each of these structures is recognized by the compiler in the incoming keyboard stream, it is connected from the PROCEDURES PAGE block. Within the PAGE (and its block) or a TASK or ACTIVITY, statements are compiled conventionally into a P-code, as illustrated later by conventional compiling techniques.

In the present system, the choice of P-code is optimizable for fast computation and easy back compilation (i.e., translation from the data structure back to a keyboard/display-compatible form). Every statement corresponds to a single P-code command to make back compilation simple. But common usages are expressed in very easily interpreted form; complex interpretation is restricted to unusual usages, to make the interpretive computation fast.

Within the PAGE (and its block) or a TASK or ACTIVITY, an ACTIVITY is compiled by creating and storing an ACTIVITY block, and positioning a pointer to that ACTIVITY block in the block which corresponds to the overriding program structure. Statements and ACTIVITIES are added to the new program structure and to that block in the same way, to any depth.

Figure 9B:
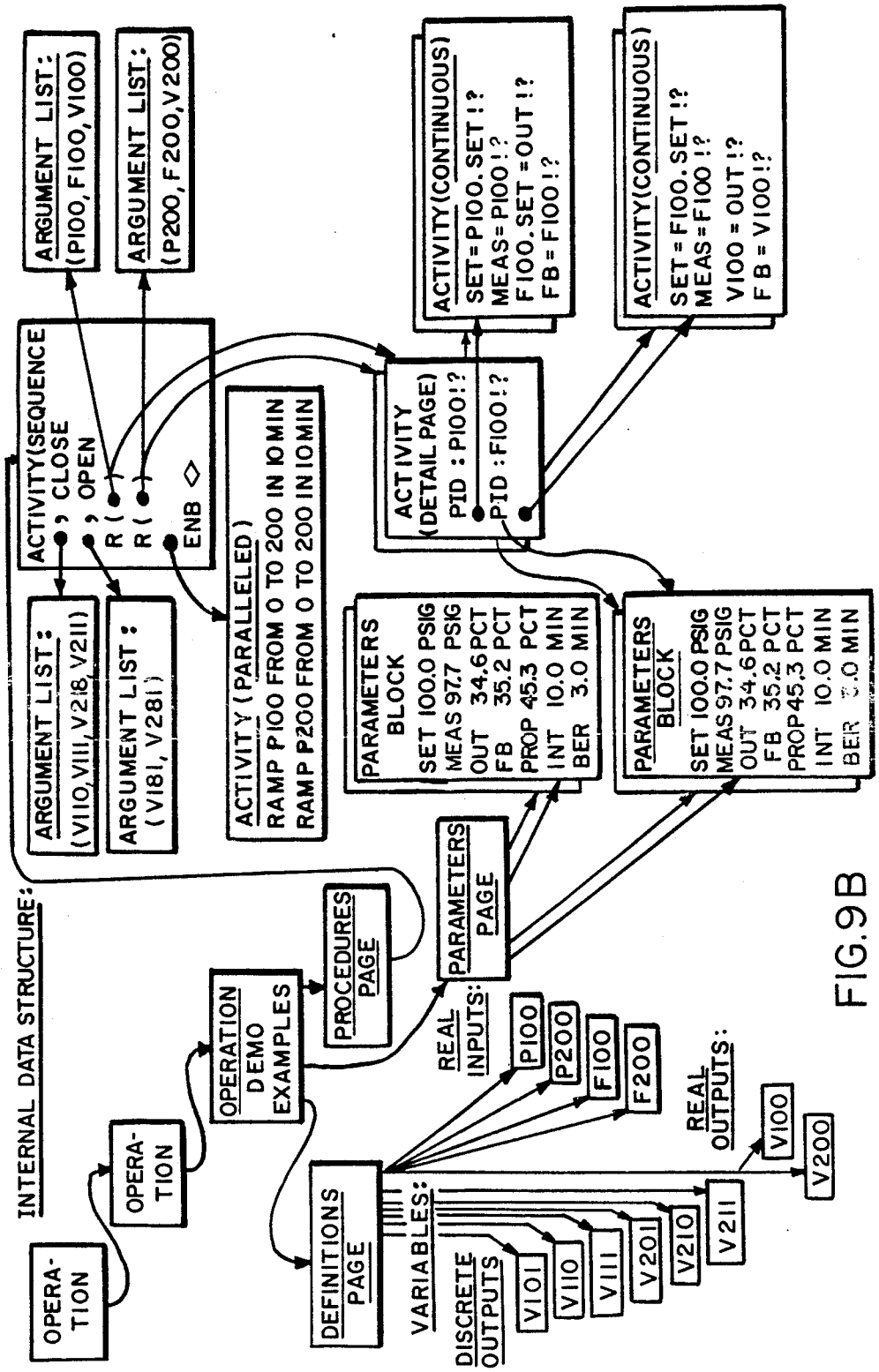
FIG. 9B is a diagrammatic illustration of the data structures resulting from the keyboard input of FIG. 9A.

Within the example, certain statements (e.g., BLOCKs and IDIOMs) cause other elemnts to be generated elsewhere. When the compiler recognizes the entry of the IDIOM call into the program, it copies an already stored ACTIVITY as a DETAILS PAGE ENTRY, with the dummy IDIOM arguments replaced by the actual IDIOM arguments, and with the Command and Feedback attributes of the Process variables explicitly defined. Such DETAILS PAGE ENTRIES are always linked from the invoking statement. FIG. 9B shows this procedure and FIGS. 9C and shows the result.

When a statement which defines a BLOCK is recognized by the compiler (whether entered by the user or compiled as a DETAILS PAGE ENTRY) the compiler sets aside a PARAMETERS PAGE BLOCK by creating a Parameters Block data block linked both from the corresponding BLOCK call, and from the appropriate PARAMETERS PAGE block. When no such block exists, one is created and linked with the OPERATION block.

FIGS. 10A–10D show the data fields of the Parameters and ACTIVITIES related blocks. The data field names already encountered behave as before. The PARAMETERS PAGE block also has a Block Length parameter defining the number of PARAMETER BLOCKS of the OPERATION. The Block Pointers point to the PARAMETER BLOCK data blocks.

The data blocks corresponding to the individual PARAMETER BLOCKs include an Algorithm Pointer, which points either to a user written control algorithm in the form of an OPERATION, or a built in function with data definitions which allow the compiler to recognize the correctness of the data values entered into the block. In addition, the data block contains the actual Block Entries or data fields.

The PROCEDURES PAGE block has a P-code data area length and the actual sequence of P-code commands corresponding to PROCEDURES PAGE statements, ACTIVITIES, and TASKs. ACTIVITY PAGE data blocks contain an optional field (which makes the ACTIVITY a TASK when used), a Bracket Index or code indicating the type of bracket and sequencing order associated with the ACTIVITY, an optional Argument List, the various program pointers also used by OPERATIONs, and the R-code Entries. The P-codes always includes the reference to ACTIVITIES and TASKs.

The P-code formats are illustrated in FIGS. 11A–11G. There, all references to variables in the present language structure actually represent pointers to the actual VARIABLE or SYSTEM SYMBOL blocks. The algebraic expressions also stand for lists of pointers to their component parts. Observe that the simple statements correspond to structures of fixed size, which are therefore quickly interpreted; the more complex and more unusual statements use the more convenient but more interpretation-time-intensive variable length formats. When a program is to be executed, the tranlator interprets the P-code to carry out the computations, a process which is much faster than interpreting the original text, because all references are carried out by direct pointers and the P-code formats are much more systematic and simple than the text.

The IDIOM SPACE is the second key IDIOM concept. Through this structure the system can model and define the dynamically changing control structure, while guaranteeing that each control objective ids supported by precisely the number of Degrees of Freedom needed. It can define predictably behaving control override actions and backup controls, and it can enforce needed coordinations between variables. Within any control sample time, the IDIOM SPACE defines the order of execution of the individual control calculations, avoiding unnecessary delays introduced by the interaction of control sampling with improperly ordered calculations.

Figure 12:
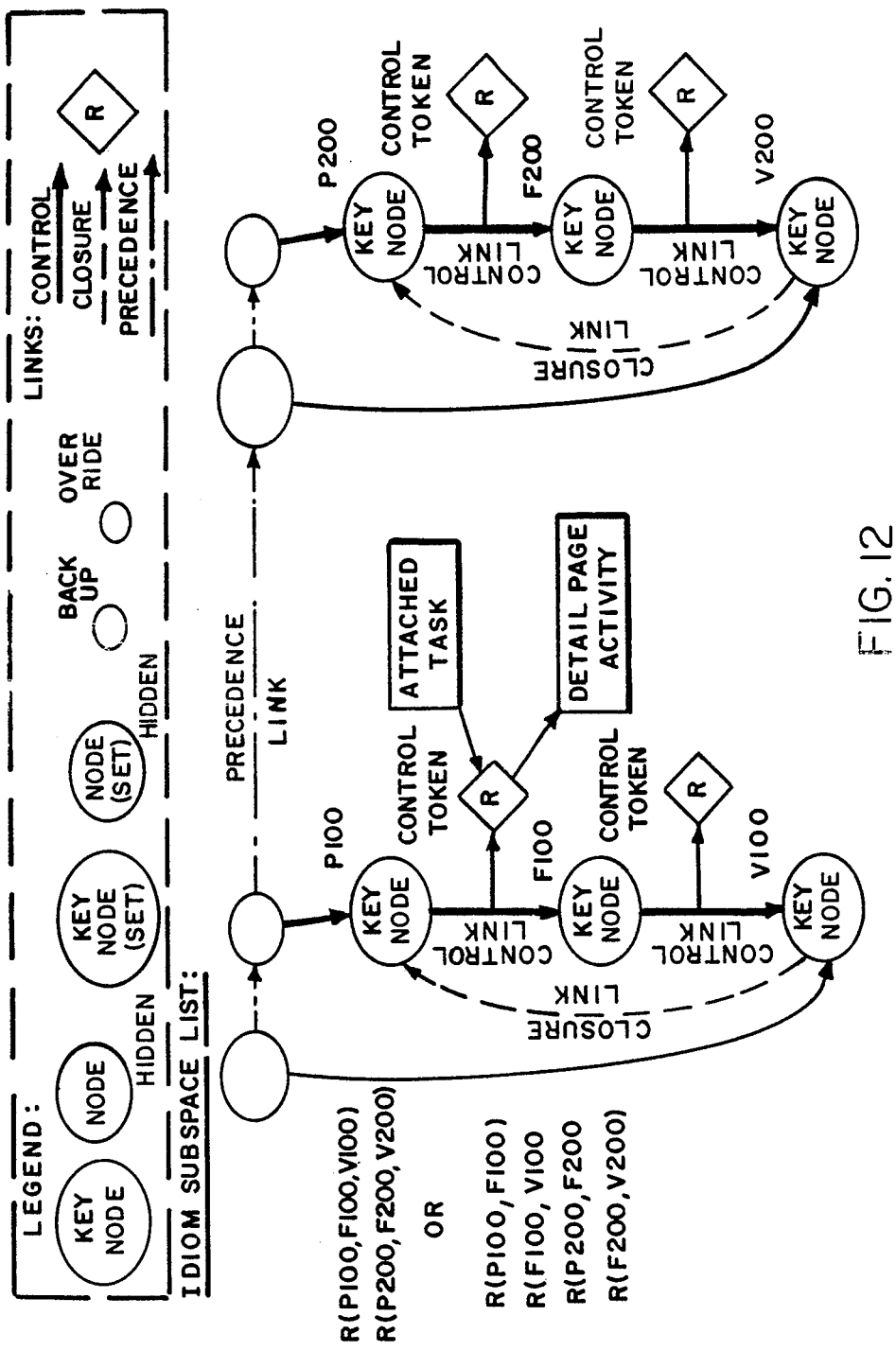
FIG. 12 is a diagrammatic illustration of the IDIOM SPACE data structure according to the present invention.

When an IDIOM call is actually executed, it is temporarily expressed by the system interpreter in the IDIOM SPACE structure as shown in the FIG. 12. The structure is put together out of various nodes, links, and tokens, as in the drawing. This language provides various functions for generally creating any one of these nodes, links and tokens, and for testing their existence, using standard list processing techniques. The structures are deleted automatically whenever the system interpreter recognizes that the creating IDIOM is no longer active. The IDIOM SPACE is made up of Key Nodes representing the control variables, and three kinds of Links: Control Links, Precedence Links and Closure Links. Control Links represent the Flow of control commands down any given degree of freedom. Closure Links close the cycle from final actuator Key Node to the Key Node corresponding to the primary measurement being controlled. Control Tokens are used to associate a particular control calculation with each Control Link. The Token is also linked to the DETAILS PAGE ACTIVITY which defines the actual conrol calculation, and the ACTIVITY whose termination causes the restoration of the IDIOM SPACE to its prior state. Parts of the IDIOM SPACE not connected by the action of IDIOM calls will be connected by Precedence Links in order of their entry in the program, as altered by special precedence-ordering commands.

The IDIOM SPACE is built up as follows: whenever as IDIOM defining program commands the creation of a Control Link, it also causes the creation of any required Key Nodes (one on either end of the link not yet created). It also positions a closure link from any involved controlling Key Node which is not a controlled Key Node of some other IDIOM call, to a controlled Key Node which is not a controlling Key Node of some other IDIOM. Where either node is not isolated in this way, the prior Closure Links leading to the Key Nodes are disconnected and instead are connected or combined in such a way that closure links previously linked to controlling nodes are now connected to the links previously linking from the controlled nodes. In this way, the SPACE is built up as the IDIOM calls are invoked.

The IDIOM SPACE forms the basis for checking the validity of the resource commitments according to degree of freedom, and establishes the order of carrying out the control calculations at each sample time. The former checks are carried out by checking to guarantee that no direct link is connected from a Key Node already connected from, or to one already connected to. As an exception, Set Key Nodes generalize this concept to nodes which can have at most some fixed number of links leaving or arriving at them. In addition, the system checks to see that the control links do not make a cycle by themselves.

The ordering of calculations is carried out by starting at the head of the SUBSPACE LIST as shown in Fig. 12, and moving down the predcedence links to process Key Nodes which are not controlling in order. From each such node, the system follows the chain of control links until a controlling node is encountered which is not also controlled. The closure link is then followed back up to the SUBSPACE LIST chain to get the next Key Node. As the control links are followed, each token which is encountered is executed. Any backup nodes which are encountered cause a diversion down the corresponding control links, returning up the closure links to resume processing. Similarly, any Override nodes which are encountered cause a diversion up the corresponding closure links, to return down the control links carrying out all tokens encountered along the way.

Having thus described an exemplary embodiment of the invention, it will be apparent that various alterations, modifications and improvements will readily occur to those skilled in the art. Such obvious alterations, modifications and improvements, though not expressly described above, are nevertheless intended intended to be implied and are within the spirit and scope of the invention. Accordingly, the foregoing discussion is intended to be illustrative only, and not limiting; the invention is limited and defined only by the following claims and equivalents thereto.

What is claimed is:

1. A method of operating a computer system to form computer program code from source statements indicative of process control operations, the source statements including both textual statements and symbols associated with certain of such textual statements, each such symbol being selected from among a set of available symbols, each of such available symbols signifying an order for performance of the operations represented by the associated textual statements, such method comprising the steps of:

operating the computer system so as, for each occurrence of one of such predetermined symbols, to identify those source statements associated therewith; and operating the computer system so as to translate the predetermined symbols into appropriate, more-detailed commands to cause the operations represented by such source statements to be performed by the computer system in the order represented by such symbols.

2. The method of claim 1 wherein at least one of the symbols is at least partly a graphical symbol.

3. The method of claim 2 wherein at least one of the graphical symbols is a bracket.

4. The method of claim 3 wherein the design of each graphical symbol is suggestive of the order for performance of the operations represented by the associated source statements.

* * * * *